(12) United States Patent  
Aoki et al.

(10) Patent No.: US 8,228,393 B2  
(45) Date of Patent: Jul. 24, 2012

(54) IMAGING APPARATUS CAPABLE OF RECORDING A MOVING IMAGE AND A STILL IMAGE

(75) Inventors: Taizo Aoki, Hyogo (JP); Yuki Ueda, Osaka (JP)

(73) Assignee: Panasonic Corporation, Osaka (JP)

( * ) Notice: Subject to any disclaimer, the term of this patent is extended or adjusted under 35 U.S.C. 154(b) by 270 days.

(21) Appl. No.: 12/711,368

(22) Filed: Feb. 24, 2010

(65) Prior Publication Data

US 2010/0214427 A1 Aug. 26, 2010

(30) Foreign Application Priority Data

Feb. 25, 2009 (JP) ................................ 2009-041942

(51) Int. Cl.
*H04N 5/225* (2006.01)
*H04N 5/76* (2006.01)
*H04N 5/222* (2006.01)

(52) U.S. Cl. .............. 348/220.1; 348/231.1; 348/333.02

(58) Field of Classification Search .............. 348/220.1, 348/231.1, 333.02, 333.04
See application file for complete search history.

(56) References Cited

U.S. PATENT DOCUMENTS

| | | | | |
|---|---|---|---|---|
| 5,905,528 A * | 5/1999 | Kodama | .............. | 348/220.1 |
| 7,768,553 B2 * | 8/2010 | Kamiya | .............. | 348/220.1 |
| 2001/0048472 A1 * | 12/2001 | Inoue et al. | .............. | 348/207 |
| 2002/0012051 A1 * | 1/2002 | Mizoguchi | .............. | 348/220 |
| 2005/0093988 A1 * | 5/2005 | Haas et al. | .............. | 348/220.1 |
| 2007/0206944 A1 * | 9/2007 | Ieda | .............. | 396/287 |
| 2011/0242360 A1 * | 10/2011 | Mori | .............. | 348/231.1 |
| 2011/0279696 A1 * | 11/2011 | Nakata et al. | .............. | 348/220.1 |

FOREIGN PATENT DOCUMENTS

| | | | |
|---|---|---|---|
| EP | 1998547 A2 | * | 12/2008 |
| JP | 7-326172 | | 12/1995 |
| JP | 10013721 A | * | 1/1998 |
| JP | 2000299800 A | * | 10/2000 |
| JP | 2001016490 A | * | 1/2001 |
| JP | 2001069442 A | * | 3/2001 |
| JP | 2004228826 A | * | 8/2004 |
| JP | 2004-350129 | | 12/2004 |
| JP | 2005-236702 | | 9/2005 |
| JP | 2005318261 A | * | 11/2005 |
| JP | 2006-174166 | | 6/2006 |
| JP | 2007028581 A | * | 2/2007 |
| JP | 2008301014 A | * | 12/2008 |
| JP | 2011044855 A | * | 3/2011 |

* cited by examiner

*Primary Examiner* — John Villecco

(74) *Attorney, Agent, or Firm* — Panasonic Patent Center; Dhiren Odedra; Kerry Culpepper

(57) ABSTRACT

An imaging apparatus capable of recording a moving image and a still image includes a recording unit for recording image data of the moving image or the still image generated by an imaging unit in a recording medium, and a display unit for displaying first capacity information related to recordable time of the moving image to the recording medium when recording the moving image and displaying second capacity information related to number of still images recordable in the recording medium when recording the still image. Even after the recording of the moving image is completed, the display unit continuously displays the first capacity information until a predetermined time passes. Even after the recording of the still images is completed, the display unit continuously displays the second capacity information until the predetermined time passes. After the predetermined time passes, the display unit displays either one of the first capacity information and the second capacity information.

8 Claims, 5 Drawing Sheets

DISPLAY OF NUMBER OF RECORDABLE STILL IMAGES

A

DISPLAY OF RECORDABLE TIME OF MOVING IMAGE

B

DISPLAY OF NUMBER OF RECORDABLE STILL IMAGES

4321

A

DISPLAY OF RECORDABLE TIME OF MOVING IMAGE

33m22s

B

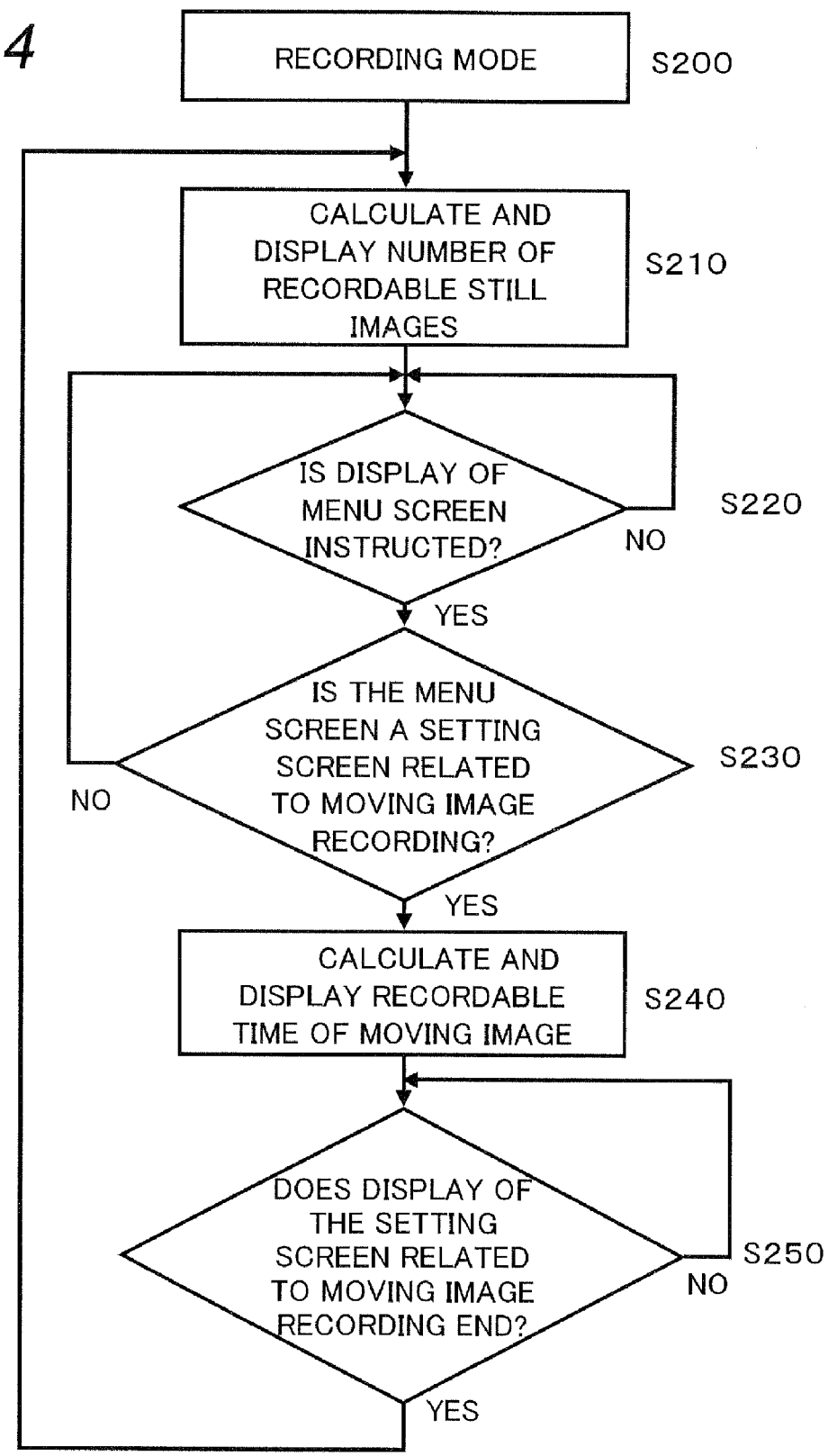

RECORDING MODE (WITH A THROUGH IMAGE DISPLAYED)

SETTING SCREEN RELATING TO MOVING IMAGE RECRDING

IMAGING APPARATUS CAPABLE OF RECORDING A MOVING IMAGE AND A STILL IMAGE

BACKGROUND

1. Technical Field

The technical field relates to an imaging apparatus capable of imaging a moving image and a still image, and more particularly to an imaging apparatus capable of presenting information about the remaining capacities for recording the moving image and the still image.

2. Related Art

JP 7-326172 A discloses a recording apparatus capable of recording a moving image and a still image. This recording apparatus displays the remaining capacity of a recording medium in the number of recordable still image when recording a still image or in recordable time when recording a moving image. As a result, even when a moving image and a still image are recorded selectively, a user can accurately recognizes the remaining amount of a memory for both the moving image and the still image in a short time.

In recent years, the capacity of a recording medium tends to increase more and more, and data amount for recording a moving image and a still image by an imaging apparatus also increases as the capacity of the recording medium increases. It is very important for the user to recognize recordable capacity in the imaging apparatus. Therefore, it is desired to present information about the recordable capacity in the imaging apparatus to the user in an easy-to-understand manner. Further, a recent digital still camera displays much information on a display screen, and thus it is desired not only to prevent visual confusion but also to utilize the display screen effectively.

SUMMARY

To solve the above problem, an imaging apparatus capable of providing improved user's convenience in presentation of information about recordable capacity is provided.

An imaging apparatus is provided, which is capable of recording a moving image and a still image. The imaging apparatus includes an imaging unit for capturing a subject image to generate image data, a recording unit for recording image data of the moving image or the still image generated by the imaging unit in a recording medium, and a display unit for displaying first capacity information related to recordable time of the moving image to the recording medium when recording the moving image, and displaying second capacity information related to number of still images recordable in the recording medium when recording the still image. Even after the recording of the moving image is completed, the display unit continuously displays the first capacity information until a predetermined time passes. Even after the recording of the still images is completed, the display unit continuously displays the second capacity information until the predetermined time passes. After the predetermined time passes, the display unit displays either one of the first capacity information and the second capacity information.

According to the above aspect, a number of recordable still images and a recordable time of the moving image are not simultaneously displayed on a monitor. Hence, it is possible to prevent a user from confusing the number of recordable still images with the recordable time of the moving image, thereby improving convenience of the imaging apparatus. Further the recordable time or the number of recordable still images is continuously displayed for a predetermined time after recording the moving image or still image is completed. Hence, the user can easily visually recognize the recordable time or the number of recordable still images.

BRIEF DESCRIPTION OF DRAWINGS

FIG. 4 is a flow chart illustrating the monitor display during menu selection.

DETAILED DESCRIPTION OF PREFERRED EMBODIMENTS

A preferred embodiment is described below with reference to the accompanying drawings.

1. First Embodiment

1-1. Outline

A digital camera according to the embodiment can record a moving image and a still image. The digital camera selectively displays either one of a recordable time of the moving image and a number of recordable still images on a display monitor.

1-2. Configuration

1-2-1. Electric Configuration

Figure 1:
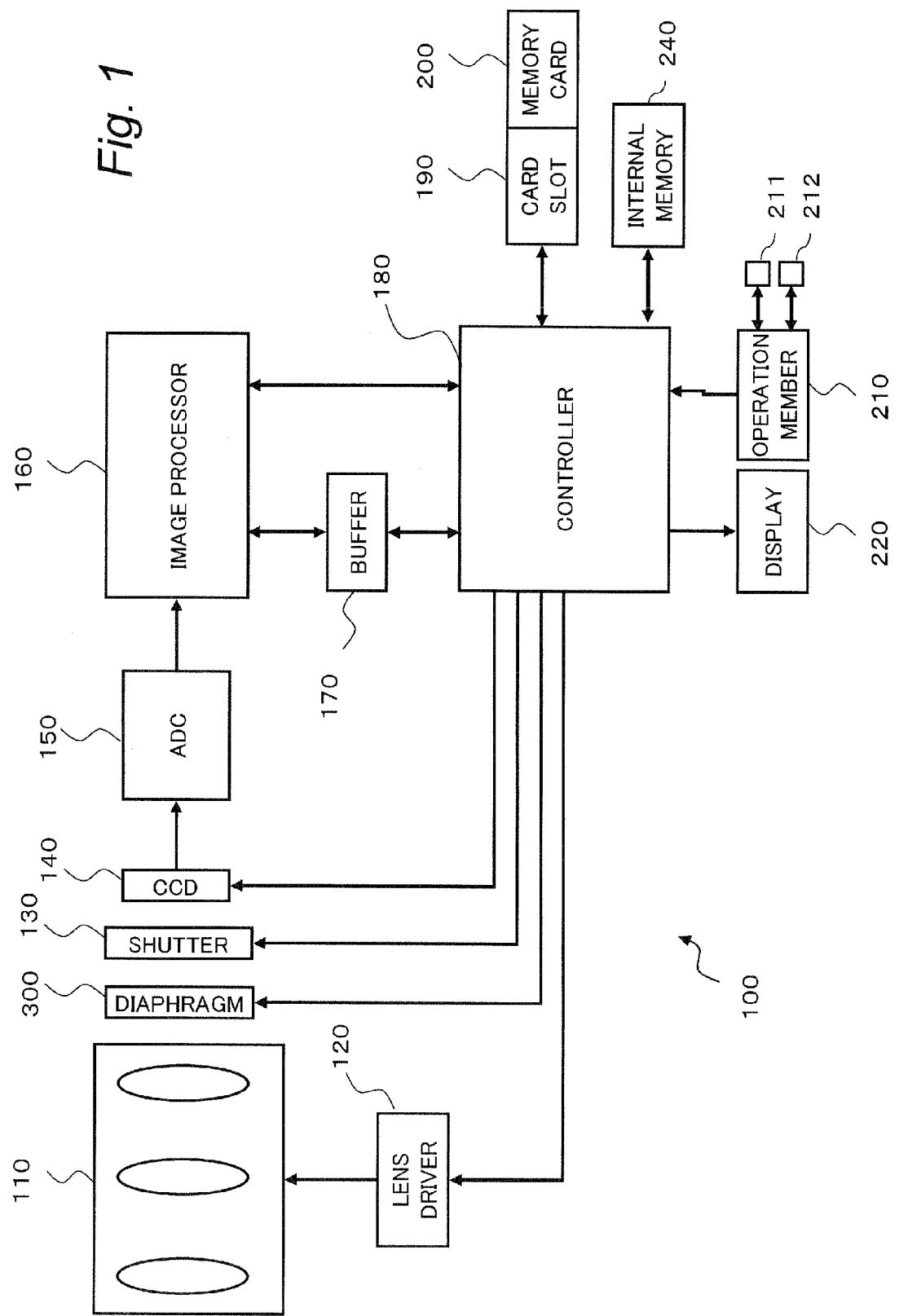
FIG. 1 is a block diagram illustrating a digital camera according to a first embodiment.

A configuration of the digital camera according to the embodiment is described with reference to FIG. 1. The digital camera 100 captures a subject image formed by an optical system 110 including one or a plurality of lenses with a CCD image sensor 140. Image data generated by the CCD image sensor 140 is subjected to various processes in an image processor 160 and then is stored in a memory card 200. The configuration of the digital camera 100 is described in detail below.

The optical system 110 includes a zoom lens and a focus lens. When the zoom lens is moved along an optical axis, a subject image can be zoomed in or zoomed out. When the focus lens is moved along the optical axis, a focus of the subject image can be adjusted.

A lens driver 120 drives the various lenses included in the optical system 110. The lens driver 120 includes, for example, a zoom motor for driving the zoom lens and a focus motor for driving the focus lens.

A diaphragm 300 regulates an aperture according to a user's setting or automatically to regulate a quantity of transmitting light.

A shutter 130 is a unit for shutting light incident to the CCD image sensor 140.

The CCD image sensor 140 captures a subject image formed by the optical system 110 to generate image data. The CCD image sensor 140 performs various operations such as exposure, transfer, and electronic shutter.

An A/D converter 150 converts analog image data generated by the CCD image sensor 140 into digital image data.

The image processor 160 performs various processes on the image data generated by the CCD image sensor 140. The image processor 160 performs a process on the image data generated by the CCD image sensor 140 to generate image data to be displayed on a display monitor 220 or generate image data to be stored in a memory card 200. For example, the image processor 160 performs various processes such as a gamma correction, a white balance correction and a defect correction on the image data generated by the CCD image sensor 140. Further, the image processor 160 compresses the image data generated by the CCD image sensor 140 according to a compression format in conformity with the JPEG standard. The image processor 160 can be realized by a DSP (Digital Signal Processor) or a microcomputer.

A controller 180 is a controller for making an entire control. The controller 180 can be realized by a semiconductor element or the like. The controller 180 may be composed of hardware alone or a combination of hardware and software. The controller 180 can be realized by a microcomputer or the like.

A buffer 170 functions as a work memory of the image processor 160 and a controller 180. The buffer 170 can be realized by, for example, a DRAM, a ferroelectric memory, or the like.

The memory card 200 can be attached/detached to/from a card slot 190. The card slot 190 can be mechanically and electrically connected to the memory card 200. The memory card 200 includes therein a flash memory or a ferroelectric memory or the like, and can store data such as an image file generated by the image processor 160.

An internal memory 240 is composed of a flash memory, a ferroelectric memory, or the like. The internal memory 240 stores a control program for entirely controlling the digital camera 100, or the like.

An operation member 210 is a collective term of user interfaces for receiving user's operations. For example, the operation member 210 includes a cursor keys and a set button for receiving user's operations. The operation member 210 includes a release button 211 for instructing start of recording the still image, and a moving image recording start button 212 for instructing start of recording the moving image. The release button 211 and the moving image recording start button 212 are each provided independently. The user can set an operation mode of the digital camera 100 by operating the operation member 210. The operation mode includes a recording mode for recording a moving image or a still image, and a playback mode for reproducing the recorded image data.

A display monitor 220 can display an image (through image) represented by image data generated by the CCD image sensor 140 or an image represented by image data read from the memory card 200. The display monitor 220 can display various menu screens for performing various settings of the digital camera 100, and so on. The display monitor 220 displays a recordable time of the moving image when recording the moving image, and displays the number of the recordable still images when recording the still image, as the information about the remaining capacity of the memory card 200. When operation other than recording the moving image and the still image is done, the display monitor 220 displays either one of the recordable time of the moving image and the number of the recordable still images, superimposed on a through image based on a predetermined setting. The predetermined setting is hereinafter referred to as "display setting of the remaining capacity of the memory card". The user can arbitrarily set the display setting of the remaining capacity of the memory card.

1-2-2. Correspondence of Terms

The COD image sensor 140 is one example of an imaging unit. The memory card 200 is one example of a storage unit. The display monitor 220 is one example of a display unit. The operation member 210 is one example of an operation receiving unit.

1-3. Operation 1-3-1. Monitor Display Upon Recording Moving Image

Figure 2:
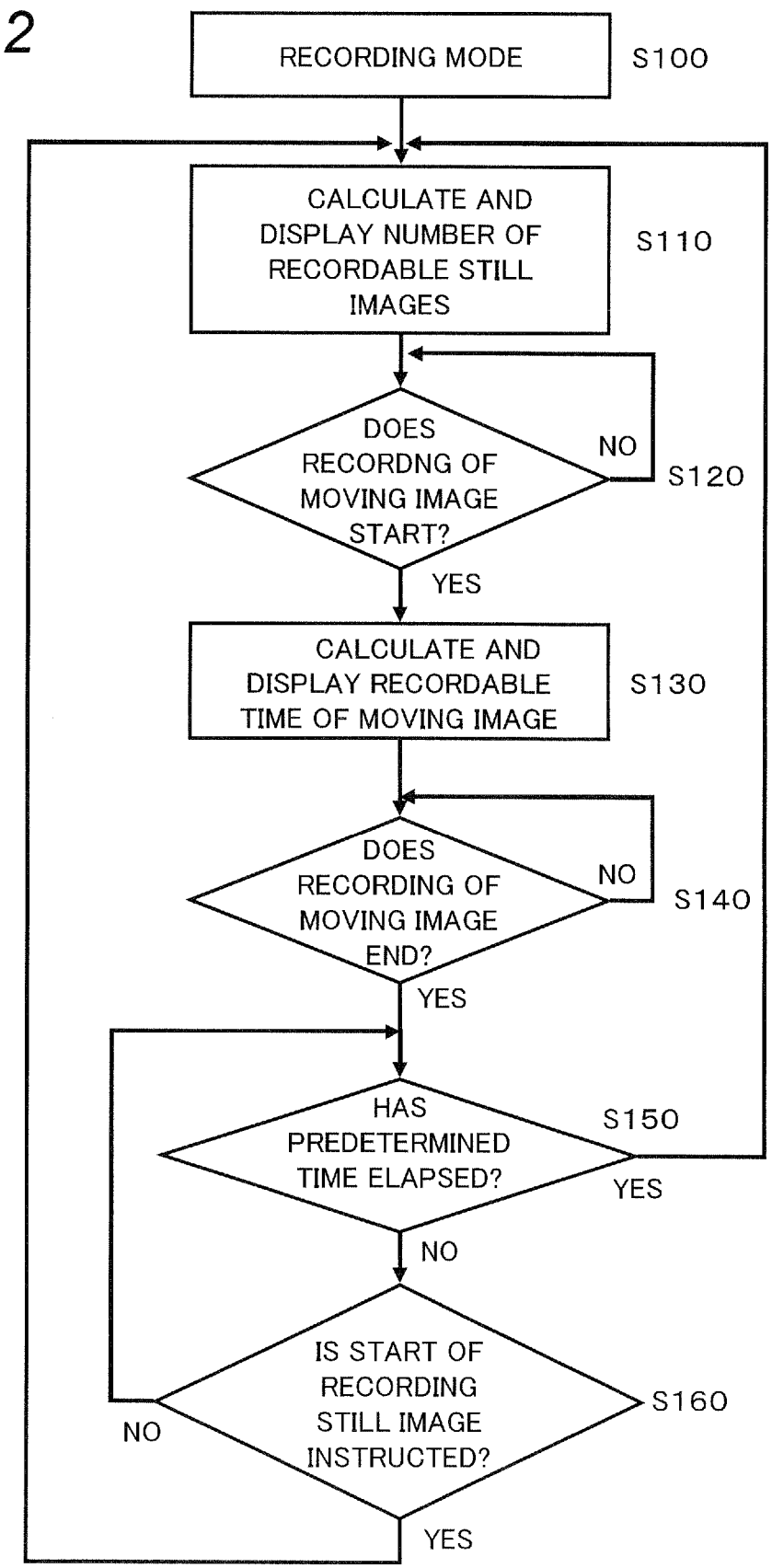
FIG. 2 is a flowchart illustrating a monitor display during a recording mode.
Figure 3A:
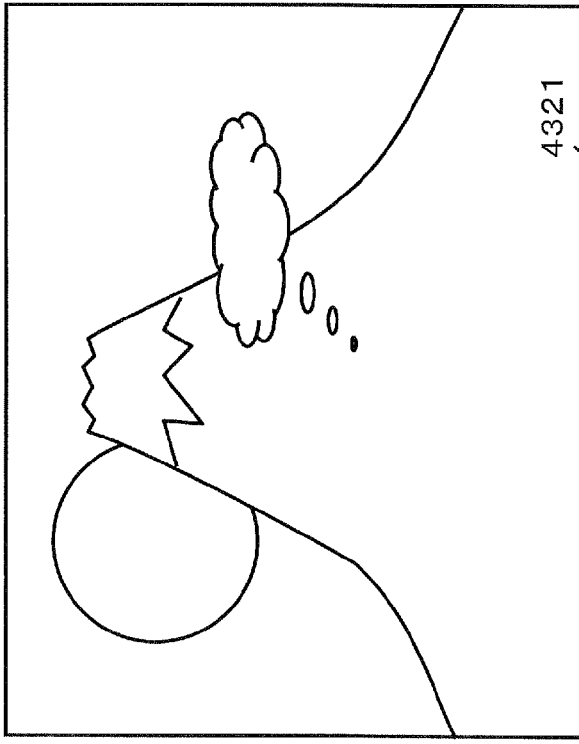
FIGS. 3A and 3B are diagrams explaining the monitor display during the recording mode.
Figure 3B:
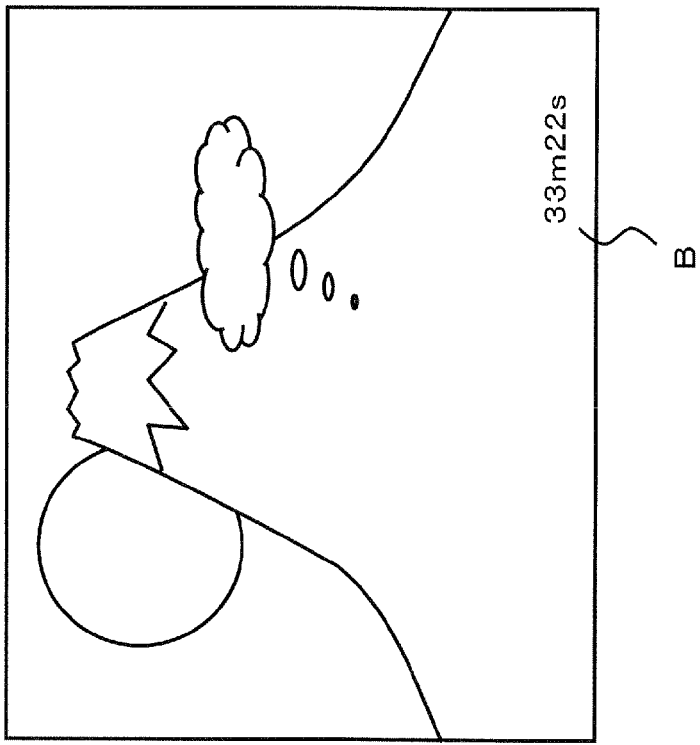

The digital camera 100 according to this embodiment can record a still image and a moving image. The monitor display of the digital camera 100 upon recording a moving image is described with reference to FIGS. 2, 3A and 3B. FIG. 2 is a flowchart for the monitor display when recording a moving image. FIGS. 3A and 3B are diagrams describing the monitor display when recording a moving image.

The user can record a still image by pressing down the release button 211 on the digital camera 100 which is set to the recording mode. The user can record a moving image by pressing down the moving image recording start button 212 on the digital camera 100 which is set to the recording mode.

As to the display setting of the remaining capacity of the memory card, the user can set which information is displayed on the display monitor 220 between information about the number of recordable still images and information about the recordable time of a moving image, by pressing down a predetermined button (for example, a menu button) of the operation member 210. The number of recordable still images and the recordable time of a moving image can be calculated based on the remaining capacity of the memory card 200.

A control of the monitor display upon recording a moving image is described below with reference to FIG. 2. In the following description, the number of recordable still images is set to be displayed on the display monitor 220 as the display setting of the remaining capacity of the memory card.

The user operates a predetermined button of the operation member 21C to set the digital camera 100 to the recording mode (S100). When it is set to the recording mode, the controller 180 performs display according to the display setting of the remaining capacity of the memory card. Here, the controller 180 controls the display monitor 220 to display the number of recordable still images. Concretely, the controller 180 calculates a number of recordable still images based on the remaining capacity of the memory card 200, or the like, to display information about the calculated number on the display monitor 220 (S110). As shown in FIG. 3A, for example, the display monitor 220 displays a through image and further displays the number A of recordable still images.

Thereafter, the controller 18C determines whether the user presses down the moving image recording start button 212 (S120). When it is determined that the moving image recording start button 212 is pressed down, the controller 180 starts recording of the image data generated by the image processor 160 in the memory card 200, calculates the recordable time of a moving image based on the remaining capacity of the memory card 200 and so on to display it on the display monitor 220 (S130). As shown in FIG. 3B, for example, the display monitor 220 displays a through image and further displays the recordable time B of the moving image. The recordable time B is preferably displayed on the same position as that of the number A in consideration of user's viewability. As a result, the number of recordable images and the recordable time can be displayed on a limited area. This is advantageous particularly to display on a small liquid crystal display.

Thereafter, the controller 180 determines whether the instruction to stop the recording of the moving image is received from the user (S140). When it is determined that the instruction to stop the recording of the moving image is received, the controller 180 determines whether a predetermined time has passed after the instruction to stop the recording of the moving image is received (S150). The predetermined time is set to 5 sec. However, it is not necessarily 5 sec. Any values such as 3 sec and 7 sec can be adopted as the predetermined time. At this time, the display monitor 220 displays the recordable time of the moving image.

When it is determined that the predetermined time has passed after the instruction to stop the recording of the moving image is received, the controller 180 returns the display on the display monitor 220 to a display which is set according to the display setting of the remaining capacity of the memory card. That is, the controller 180 calculates the number of recordable still images based on the remaining capacity of the memory card 200 and so on, to display the calculated number on the display monitor 220 (S110).

On the other hand, when it is determined that the predetermined time has not passed after the instruction to stop the recording of the moving image is received, the controller 180 determines whether an instruction for recording the still image is received, that is, whether the release button 211 is pressed down by the user (S160). When it is determined that the instruction for recording the still image is received, although the predetermined time has not yet passed, the controller 180 calculates the number of recordable still images based on the remaining capacity of the memory card 200 and so on, to display information about the calculated number on the display monitor 220 (S110). On the other hand, when it is determined that the instruction for recording the still image is not received, the controller 180 determines again whether the predetermined time has passed (S150). In this manner, if recording of the still image is not instructed, the recordable time of the moving image is continuously displayed on the display monitor 220 until the predetermined time passes after the instruction to stop the recording of the moving image is received.

As described above, according to this embodiment, even if the digital camera 100 is set to display the number of recordable still images on the display monitor 220 as the display setting of the remaining capacity of the memory card, the recordable time of the moving image is displayed on the display monitor 220 when the recording of the moving image is started. With this arrangement, the user can recognize the recordable time of the moving image on the display monitor 220 when recording the moving image.

The digital camera 100 continuously displays the recordable time of the moving image on the display monitor 220 without switching the display of the display monitor 220 to the number of recordable still images, until the predetermined time passes after the recording of the moving image is stopped. This is because the recording of the moving image is much likely to be restarted within comparatively short time after the recording of the moving images is stopped. Hence, even when the recording of the moving image is restarted immediately after the recording of the moving image is stopped, the user can recognize the recordable time of the moving image.

In the digital camera 100 according to this embodiment, even before the predetermined time passes after the recording of the moving image is stopped, the number of recordable still images is immediately displayed on the display monitor 220 when the release button 211 is pressed down (the user instructs the recording of the still image). This is because after the user presses down the release button 211, the user is likely to restart the recording of the moving image, and thus the display of the number of recordable still images much conforms to a user's convenience.

1-3-2. Monitor Display Upon Menu Selection

Figure 5A:
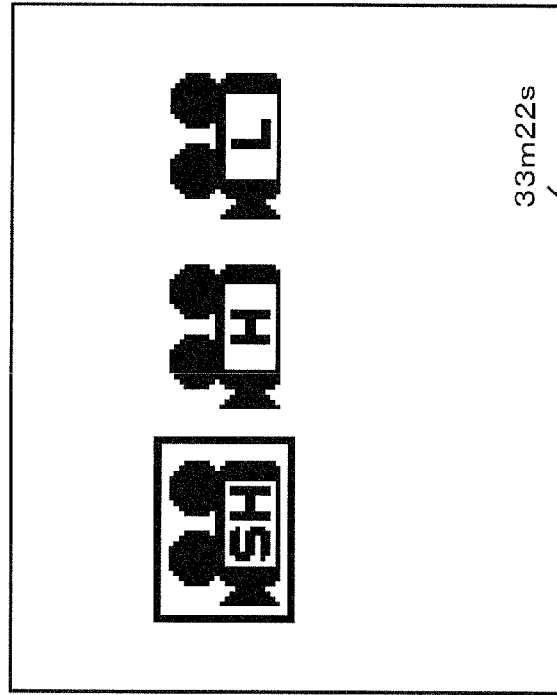
FIGS. 5A and 5B are diagrams explaining the monitor display during the menu selection.
Figure 5B:
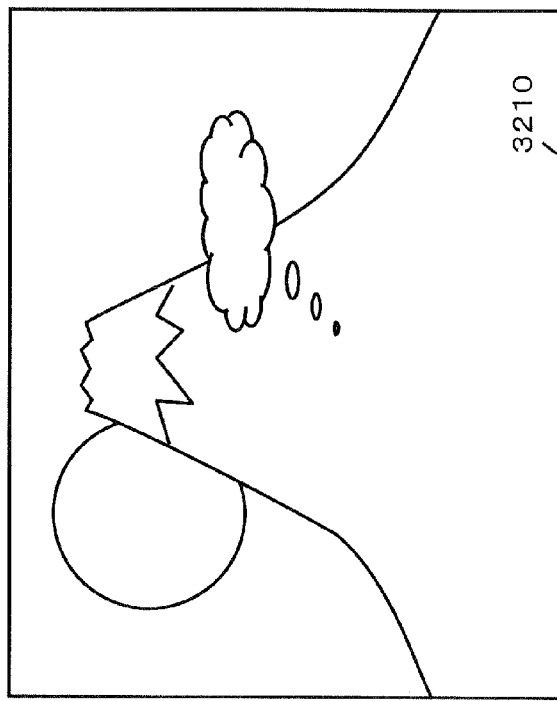

A control of the monitor display upon menu selection in the digital camera 100 is described below with reference to FIGS. 4, 5A and 5B. FIG. 4 is a flowchart describing the monitor display upon menu selection. FIGS. 5A and 5B are diagrams for explaining the monitor display upon menu selection.

The user operates a predetermined button (for example, the menu button) of the operation member 210 to set the digital camera 100 to the recording mode (S200). When digital camera 100 is set to the recording mode, the controller 180 calculates number of recordable still images based on the remaining capacity of the memory card 200 and so on, and displays information about the calculated number on the display monitor 220 (S210). AS shown in FIG. 5A, for example, the display monitor 220 displays a through image and further displays the number A of recordable still images.

Thereafter, the controller 180 determines whether the menu screen is displayed on the display monitor 220 by the user's operation to the predetermined button of the operation member 210 (S220).

When it is determined that the menu screen is displayed on the display monitor 220, the controller 180 determines whether the menu screen displayed on the display monitor 220 is a menu screen relating to recording of the moving image (S230). Here, the menu screen relating to recording of the moving image includes a screen for selecting a number of pixels of a moving image to be recorded, as shown in FIG. 5B, for example. In FIG. 5B, "SH" means a full hi-vision moving image, "H" means a hi-vision moving image, and "L" means a standard moving image.

When it is determined that the display monitor 220 displays the menu screen relating to recording of the moving image, the controller 180 calculates the recordable time of the moving image based on the remaining capacity of the memory card 200 and so on, and displays the calculated recordable time on the display monitor 220 (S240). For example, as shown in FIG. 5B, the display monitor 220 displays the menu screen relating to recording of the moving image, and further displays the recordable time B of the moving image.

Thereafter, the controller 180 determines whether the instruction to end the display of the menu screen relating to recording of the moving image is received from the user (S250). When the controller 180 determines that the instruction to end the display of the menu screen relating to recording of the moving image is received from the user, the controller 180 calculates the number of recordable still images based on the remaining capacity of the memory card 200 and so on, and displays the calculated number on the display monitor 220 (S210). On the other hand, when it is determined that the instruction to end the display of the menu screen relating to recording of the moving image is not received, the controller 180 continuously displays the information about the recordable time of the moving image on the display monitor 220.

In this manner, even if the digital camera 100 is set to display the number of recordable still images on the display monitor 220, the recordable time of the moving image is displayed on the display monitor 220 when the menu screen relating to recording of the moving image is displayed on the display monitor 220. With this arrangement, even if the digital camera 100 is set to display the number of recordable still images on the display monitor 220 as the display setting of the remaining capacity of the memory card, when the user performs the settings relating to recording of the moving image, the user can recognize the recordable time of the moving image.

2. Other Embodiment

The above description is only one exemplary embodiment of an imaging apparatus. Another exemplary embodiment is described below.

In the above embodiment, the CCD image sensor 140 is used as the imaging unit, but a CMOS image sensor or an NMOS image sensor may also be used.

The image processor 160 and the controller 180 may be implemented in one semiconductor chip or in separate semiconductor chips.

The above embodiment describes the example where the recordable time of the moving image is displayed until the predetermined time passes after the recording of the moving image is completed, but the same control can be made also after the recording of the still image is completed. That is, the number of recordable still images may be continuously displayed until the predetermined time passes after the recording of the still image is completed. Specifically, when the recording of the still image is started while displaying the recordable time of the moving image on the display monitor 220, the number of recordable still images is displayed on the display monitor 220. Thereafter, the number of recordable still images is continuously displayed for the predetermined time after the recording of the still image is completed, and then the information may be displayed according to the display setting of the remaining capacity of the memory card.

The above embodiment describes the example where the recordable time of the moving image is displayed on the display monitor 220 when the menu screen relating to recording of the moving image is displayed on the display monitor 220. Similarly, the number of recordable still images is displayed on the display monitor 220 when a menu screen relating to recording of a still image is displayed on the display monitor 220.

INDUSTRIAL APPLICABILITY

The embodiment can be applied to an imaging apparatus capable of recording a moving image and a still image, such as a digital still camera, a digital video camera, or a mobile telephone having a camera function.

What is claimed is:

1. An imaging apparatus capable of recording a moving image and a still image, comprising:
    an imaging unit configured to capture a subject image to generate image data;
    a recording unit configured to record image data of the moving image or the still image generated by the imaging unit in a recording medium;
    a display unit configured to display first capacity information related to recordable time of the moving image to the recording medium when recording the moving image, and displaying second capacity information related to number of still images recordable in the recording medium when recording the still image; and
    a controller configured to control the display unit, wherein
    even after the recording of the moving image is completed, the display unit continuously displays the first capacity information until a predetermined time passes, and even after the recording of the still images is completed, the display unit continuously displays the second capacity information until the predetermined time passes, and
    after the predetermined time passes, the display unit displays either one of the first capacity information and the second capacity information, and the controller switches information to be displayed on the display unit after the predetermined time passes between the first capacity information and the second capacity information based on user setting.

2. The imaging apparatus according to claim 1, wherein while the display unit displays an operation screen relating to recording of a moving image, the display unit displays the first capacity information.

3. The imaging apparatus according to claim 1, wherein while the display unit displays an operation screen relating to recording of a still image, the display unit displays the second capacity information.

4. The imaging apparatus according to claim 1, wherein the display unit displays the first capacity information and the second capacity information at the same position on the screen.

5. An imaging apparatus capable of recording a moving image and a still image, comprising:
    an imaging unit configured to capture a subject image to generate image data;
    a recording unit configured to record image data of the moving image or the still image generated by imaging unit in a recording medium;
    a display unit configured to display first capacity information related to recordable time of the moving image to the recording medium when recording the moving image, and display second capacity information related to number of still images recordable in the recording medium when recording the still image; and
    an instruction receiving unit configured to receive an instruction to record a still image from a user,
    wherein even after the recording of the moving image is completed, the display unit continuously displays the first capacity information until a predetermined time passes, and even after the recording of the still images is completed, the display unit continuously displays the second capacity information until the predetermined time passes, and
    even before the predetermined time passes after the recording of the moving image is completed, the display unit displays the second capacity information when the instruction receiving unit receives an instruction to record a still image from the user.

6. The imaging apparatus according to claim 5, wherein the display unit displays the first capacity information and the second capacity information at the same position on the screen.

7. An imaging apparatus capable of recording a moving image and a still image, comprising:
    an imaging unit configured to capture a subject image to generate image data;
    a recording unit configured to record image data of the moving image or the still image generated by the imaging unit in a recording medium;
    a display unit configured to display first capacity information related to recordable time of the moving image to the recording medium when recording the moving image, and display second capacity information related to number of still images recordable in the recording medium when recording the still image; and
    an instruction receiving unit configured to receive an instruction to record a moving image from a user,
    wherein even after the recording of the moving image is completed, the display unit continuously displays the first capacity information until a predetermined time passes, and even after the recording of the still images is completed, the display unit continuously displays the second capacity information until the predetermined time passes, and even before the predetermined time passes after the recording of the still image is completed, the display unit displays the first capacity information when the instruction receiving unit receives an instruction to record a moving image from the user.

8. The imaging apparatus according to claim 7, wherein the display unit displays the first capacity information and the second capacity information at the same position on the screen.

* * * * *